United States Patent
Fan et al.

(10) Patent No.: US 9,918,256 B2
(45) Date of Patent: Mar. 13, 2018

(54) USER EQUIPMENT, BASE STATION AND METHOD FOR HANDOVER

(71) Applicant: Telefonaktiebolaget L M Ericsson (publ), Stockholm (SE)

(72) Inventors: Rui Fan, Beijing (CN); Jinhua Liu, Beijing (CN); Yu Qian, Beijing (CN); Imadur Rahman, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 217 days.

(21) Appl. No.: 14/652,332

(22) PCT Filed: Dec. 19, 2012

(86) PCT No.: PCT/CN2012/086950
§ 371 (c)(1),
(2) Date: Jun. 15, 2015

(87) PCT Pub. No.: WO2014/094256
PCT Pub. Date: Jun. 26, 2014

(65) Prior Publication Data
US 2015/0327128 A1  Nov. 12, 2015

(51) Int. Cl.
*H04W 36/00* (2009.01)
*H04L 5/14* (2006.01)
*H04W 36/30* (2009.01)

(52) U.S. Cl.
CPC ........... *H04W 36/0055* (2013.01); *H04L 5/14* (2013.01); *H04W 36/30* (2013.01)

(58) Field of Classification Search
CPC ...... H04W 36/0055; H04W 36/30; H04L 5/14
See application file for complete search history.

(56) References Cited

U.S. PATENT DOCUMENTS 8,588,185 B2 * 11/2013 Jung ............... H04L 5/0035
370/332
2008/0119186 A1 * 5/2008 Song ................. H04W 36/10
455/436
(Continued)

FOREIGN PATENT DOCUMENTS

CN   1956587      5/2007
CN   102273248    12/2011
(Continued)

OTHER PUBLICATIONS

Alcatel-Lucent Shanghai Bell "On the study item conclusions for LTE TDD for UL-DL IMTA," 3GPP Draft TSG RAN WG1 Meeting #69, R1-122509, May 21-25, 2012, XP050601079, pp. 1-3.
(Continued)

*Primary Examiner* — Ian N Moore
*Assistant Examiner* — Latresa McCallum
(74) *Attorney, Agent, or Firm* — Patent Portfolio Builders, PLLC

(57) ABSTRACT

The present disclosure relates to a method in a User Equipment (UE) for use in handover from its serving base station to a neighboring base station. The method includes: performing one or more downlink quality measurements of the neighboring base station on one or more downlink subframes in a TDD configuration of the neighboring base station to obtain a downlink quality measurement result; and transmitting said downlink quality measurement result to the serving base station for enabling the serving base station to determine whether to trigger the handover or not.

18 Claims, 6 Drawing Sheets

(56) References Cited

U.S. PATENT DOCUMENTS

| | | | |
|---|---|---|---|
| 2010/0034158 A1* | 2/2010 | Meylan | H04L 1/1854 370/329 |
| 2012/0188877 A1 | 7/2012 | Chin et al. | |
| 2013/0155915 A1* | 6/2013 | Park | H04W 72/042 370/280 |
| 2015/0358998 A1* | 12/2015 | Golitschek Edler Von Elbwart et al. | H04W 48/16 370/280 |

FOREIGN PATENT DOCUMENTS

| | | |
|---|---|---|
| CN | 102422678 | 4/2012 |
| WO | 03/043237 A1 | 5/2003 |

OTHER PUBLICATIONS

Renesas Mobile Europe Ltd. "Discussion on Enhancements for Dynamic TDD UL-DL Configuration," 3GPP TSG-RAN WG1 Meeting #69, R1-122363, May 21-25, 2012, XP050600626, 4 Pages.

PCT Notification of Transmittal of the International Search Report and the Written Opinion of the International Searching Authority, or the Declaration for International application No. PCT/CN2012/086950 dated Sep. 26, 2013.

* cited by examiner

US 9,918,256 B2

USER EQUIPMENT, BASE STATION AND METHOD FOR HANDOVER

PRIORITY

This nonprovisional application is a U.S. National Stage Filing under 35 U.S.C. § 371 of International Patent Application Serial No. PCT/CN2012/086950, filed Dec. 19, 2012, and entitled "USER EQUIPMENT, BASE STATION AND METHOD FOR HANDOVER."

TECHNICAL FIELD

The present disclosure generally relates to communication systems, and more particularly, to a User Equipment (UE), Radio Base Station (BS) and method for handover.

BACKGROUND

Currently, dynamic Time Division Duplex (TDD) configuration has been introduced in Long Term Evolution (LTE) system. The dynamic TDD configuration means that the TDD configuration of a radio base station may vary depending on actual traffic requirements. For example, if more traffic is required in the downlink, more subframes can be allocated to the downlink. Otherwise, if more traffic is required in the uplink, more subframes can be allocated to the uplink.

FIG. 1 illustrates an example of a dynamic TDD configuration having a primary TDD configuration and a secondary TDD configuration. As shown in FIG. 1, the primary TDD configuration has more uplink subframes, while the secondary TDD configuration has more downlink subframes. A downlink subframe is illustrated by a white box with a down arrow whereas an uplink subframe is illustrated by a gray box with an up arrow. Those subframes which are configured with the same direction in the primary and secondary TDD configurations are not allowed to change their directions and those subframes which are configured with different directions between the primary and secondary TDD configurations can be dynamically configured for either downlink or uplink data transmission. In the following description, the former subframes are referred to normal uplink/downlink subframes while the latter subframes are referred to as flexible subframes.

Although the dynamic TDD configuration is suitable to meet traffic requirements, it may be problematic for a UE measuring a downlink quality (e.g., Reference Signal Receiving Power (RSRP) and/or Reference Signal Receiving Quality (RSRQ)) of a neighboring BS, which is intended to be selected as a target BS, during a handover preparation period. In a handover preparation, the UE may assume that the TDD configuration of a neighboring BS is the same as that of its serving BS and then perform measurements on the neighboring BS's downlink quality on several downlink subframes in the TDD configuration of its serving BS. However, the actual TDD configuration of the neighboring BS may be different due to the dynamic TDD configuration.

FIG. 2 exemplifies TDD configurations of a serving BS and a neighboring BS of a UE. The TDD configuration of the serving BS is DSUDDDDDDD and the TDD configuration of the neighboring or target BS is DSUUUDSUUU. "D" denotes a downlink subframe and is illustrated by a white box with a down arrow in FIG. 2. "U" denotes an uplink subframe and is illustrated by a gray box with an up arrow. "S" denotes a shared subframe and is illustrated by a white-gray mixed box. The UE served by the serving BS may measure downlink quality of the target BS at subframes 0, 1, 3, 4, 5, 6, 7, 8, 9 as shown in FIG. 2, even though subframes 3, 4, 7, 8, 9 are uplink subframes for the neighboring or target BS.

For example, when a UE moves from its serving cell to a neighboring cell with less normal downlink subframes (i.e., moving from being served by its serving BS to being served by a neighboring BS), the downlink quality (e.g., RSRP and/or RSRQ) may be underestimated if the UE assumes that the same normal downlink subframes are configured in the neighboring cell as in the serving cell and generates the downlink quality for reporting to the serving BS by filtering measurements for all these subframes in accordance with wireless handover techniques. This means that the UE may miss the proper time to trigger the handover procedure and that there is a high dropping probability.

Downlink quality underestimate generally occurs in the following two scenarios:
  When a UE moves from a macro cell to a pico cell, the pico cell may be configured with less normal downlink subframes since some subframes are configured as flexible subframes;
  The same TDD configuration for all pico cells may not be suitable because downlink and uplink traffic loads in pico cells may be different. So, it is allowed to configure different primary TDD configurations for pico cells. In such a case, a UE moves from a pico cell with more normal downlink subframes to another pico cell with less normal downlink subframes.

Still take FIG. 2 as an example and assume the TDD configuration of the serving BS is DSUDDDDDDD and the TDD configuration of the neighboring or target station is DSUUUDSUUU. Since subframes 3, 4, 7, 8, 9 are uplink subframes for the neighboring BS, RSRP/RSRQ measured by the UE in these five subframes are quite low. However, the UE still takes them into account when generating the final RSRP/RSRQ measurement report, which means e.g. a rough 3.5 dB underestimate of the downlink quality of the neighboring BS. This may have a clear negative impact on making handover decision.

SUMMARY

According to the present embodiments, an improved method for dealing with UE's measurements of its neighboring BS with dynamic TDD configuration is proposed for handover to solve or relieve at least one of the above problems or disadvantages.

In a first aspect of the present embodiments, there is provided a method in a User Equipment (UE) for use in handover from its serving BS to a neighboring BS. The method includes: performing one or more downlink quality measurements of the neighboring BS on one or more downlink subframes in a Time Division Duplex, TDD, configuration of the neighboring BS to obtain a downlink quality measurement result; and transmitting said downlink quality measurement result to the serving BS for enabling the serving BS to determine whether to trigger the handover or not.

In a second aspect of the present embodiments, there is provided a method in a serving BS for handling handover of a UE from the serving BS to a neighboring BS. The method includes: receiving from the UE a downlink quality measurement result of the neighboring BS and receiving a TDD configuration of the neighboring BS; comparing the TDD configuration of the neighboring BS with a TDD configuration of the serving BS; calculating a correction factor based on the comparison result; correcting the downlink quality measurement result with the correction factor; and determining whether to trigger the handover or not based on the corrected downlink quality measurement result.

In a third aspect of the present embodiments, there is provided a UE for use in handover from its serving BS to a neighboring BS. The UE includes a measurement unit and a transmitting unit. The measurement unit is configured to perform one or more downlink quality measurements of the neighboring BS on one or more downlink subframes in a TDD configuration of the neighboring BS to obtain a downlink quality measurement result. The transmitting unit is configure to transmit said downlink quality measurement result to the serving BS for enabling the serving BS to determine whether to trigger the handover or not.

In a fourth aspect of the present embodiments, there is provided a BS for handling handover of a UE served by the BS from the BS to a neighboring BS. The BS includes a receiving unit, a comparing unit, a calculating unit, a correcting unit and a determining unit. The receiving unit is configured to receive from the UE a downlink quality measurement result of the neighboring BS and receiving a TDD configuration of the neighboring BS. The comparing unit is configured to compare the TDD configuration of the neighboring BS with a TDD configuration of the serving BS. The calculating unit is configured to calculate a correction factor based on the comparison result. The correcting unit is configured to correct the downlink quality measurement result with the correction factor. The determining unit is configured to determine whether to trigger the handover or not based on the corrected downlink quality measurement result.

In a fifth aspect of the present embodiments, there is provided a method in a UE for use in handover from its serving BS to a neighboring BS. The method includes: for each subframe, performing a downlink quality measurement of the neighboring BS on the subframe to obtain a downlink quality measurement result; and determining the subframe is a downlink subframe if the downlink quality measurement result is higher than a predetermined threshold. The method further includes: filtering all downlink quality measurement results for all determined downlink subframes to obtain a filtered downlink quality measurement result; and transmitting the filtered downlink quality measurement result to the serving BS for enabling the serving BS to determine whether to trigger the handover or not.

In accordance with the embodiments in the first and third aspects, the present embodiments enable the UE to perform the downlink quality measurement based on the TDD configuration of the neighboring BS, which results in improvement in reliability of UE's downlink quality measurement by means of a correction at the UE's serving BS while improving accuracy of handover decision. With the embodiments in the second and fourth aspects, the present embodiments improve reliability of UE's downlink quality measurement by means of a correction at the UE's serving BS, thereby improving accuracy of handover decision.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

Figure 1:
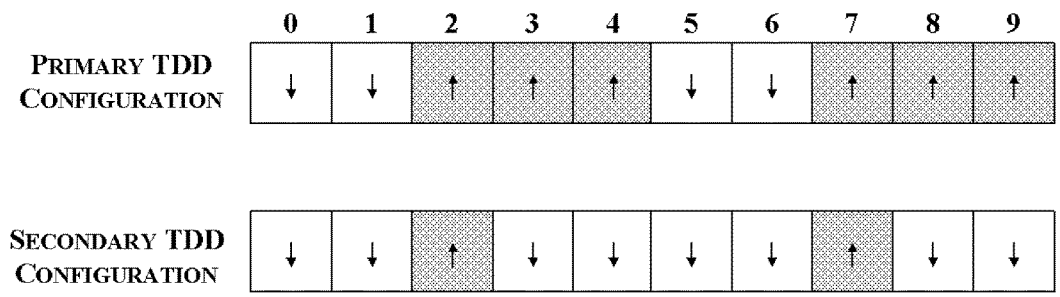
FIG. 1 exemplifies an example of a dynamic TDD configuration.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this de.

In the communication field, the expression "neighboring BS" refers to a BS in vicinity of the serving BS, wherein a UE being in communication with the serving BS is also able to detect transmission from the neighboring BS. In the following description, the expression "neighboring BS" also refers to a target BS, to which the UE is potentially switched from the serving BS during a handover procedure.

Figure 3:
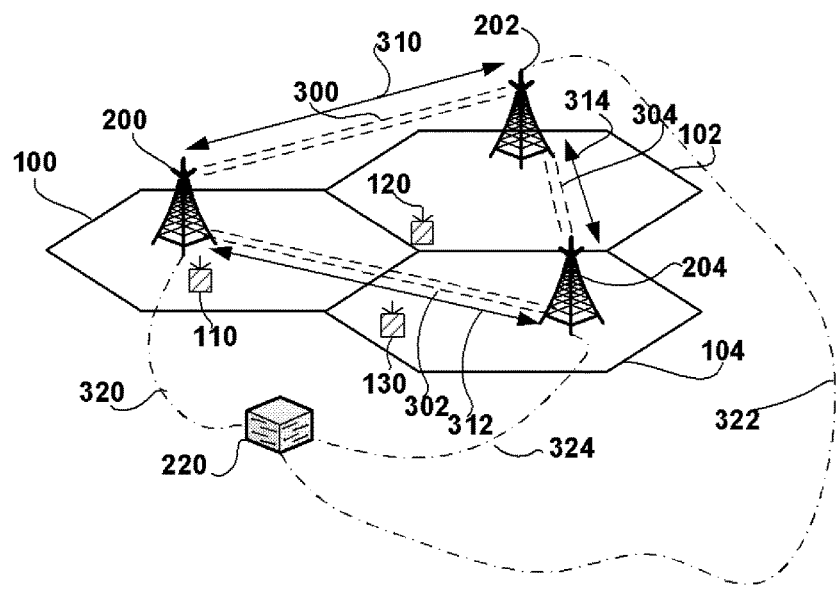
FIG. 3 shows a schematic diagram of a multi-cell wireless communication system where the present disclosure may be implemented.

FIG. 3 is a schematic diagram of a multi-cell cellular communication system where the present exemplary embodiments may be implemented. The cellular system divides a service coverage area into a number of adjacent wireless coverage areas, i.e., cells. In FIG. 3, the entire service area is formed by cells 100, 102 and 104, each being illustratively shown as a hexagon although not necessarily i.e. the cells may have other shapes. BSs 200, 202 and 204 are associated with the cells 100, 102 and 104, respectively. Each of the BSs 200-204 includes at least a transmitter and a receiver. Herein, it is to be noted that a BS or a radio base station, which is generally a serving node in a cell, can be an independent BS having a function of resource scheduling, a transmitting node belonging to an independent BS, a relay node (which is generally configured for further enlarging the coverage of a cell), or the like. As illustratively shown in FIG. 3, each of the BSs 200-204 is located in a particular area of the corresponding one of the cells 100-104 and is equipped with an omni-directional antenna. However, in a cell arrangement for the cellular communication system, each of the BSs 200-204 can also be equipped with a directional antenna for directionally covering a partial area of the corresponding one of the cells 100-104, which is commonly referred to as a sector. Thus, the diagram of the multi-cell cellular communication system as shown in FIG. 3 is illustrative only and does not imply that the implementation of the cellular system according to the present embodiments is limited to the above particular constraints.

As shown in FIG. 3, the BSs 200-204 may be connected with each other via X2 interfaces 300, 302 and 304. For example in a Long Term Evolution (LTE) system, a three-layer node network architecture including BS (also referred to as evolved-Node B (eNB)), radio network control unit and core network is simplified into a two-layer node architecture in which the function of the radio network control unit is assigned to the BS and an interface named "X2" is defined for coordination and communication between BSs.

In FIG. 3, the BSs 200-204 are also connected with each other via air interfaces, A1 interfaces, 310, 312 and 314. In a future communication system, it is possible to introduce a concept of relay node. Relay nodes are connected with each other via wireless interfaces and a BS can be considered as a special relay node. Thus, a wireless interface named "A1" can then be used for coordination and communication between BSs.

Additionally, an upper layer entity 220 of the BSs 200-204 is also shown in FIG. 3, which can be a gateway or another network entity such as mobility management entity. The upper layer entity 220 is connected to the BSs 200-204 via S1 interfaces 320, 322 and 324, respectively. In an LTE system, a wired interface named "S1" is defined for coordination and communication between the upper layer entity and the BS.

A number of User Equipments (UEs) 110, 120 and 130 are distributed over the cells 100-104, as shown in FIG. 3. As known to those skilled in the art, each of the UEs 110-130 includes a transmitter, a receiver and a mobile terminal control unit. Each of the UEs 110-130 can access the cellular communication system via its serving BS (one of the BSs 200-204). It should be understood that while only 3 UEs are illustratively shown in FIG. 3, there may be a large number of UEs in practice. In this sense, the description of the UEs in FIG. 3 is also for illustrative purpose only. Each of the UEs 110-130 can access the cellular communication network via respective serving BS. The BS directly providing communication service to a certain UE is referred to as the serving BS of that UE, while other BSs are referred to as non-serving BSs of that UE. The non-serving BSs can function as coordinated BSs of the serving BS and provide communication service to the UE along with the serving BS.

For explanation, UE 110 may be considered. Normally, UE 110 has BS 200 as its serving BS and has BSs 202 and 204 as neighboring BSs of its serving BS. In an exemplary scenario, there are two neighboring BSs. However, the present embodiments are not limited to this. In fact, the present embodiments are not limited to any specific number of neighboring BS(s). Normally, UE 110 measures downlink quality (such as RSRP and/or RSRQ) of either neighboring cell of its serving cell 100, such as cell 102 or cell 104. When obtaining a measurement result by filtering measurements for all considered subframes, UE 110 may report such a result to BS 200, which in turn decides whether to trigger a handover to the measured BS or not.

Figure 4:
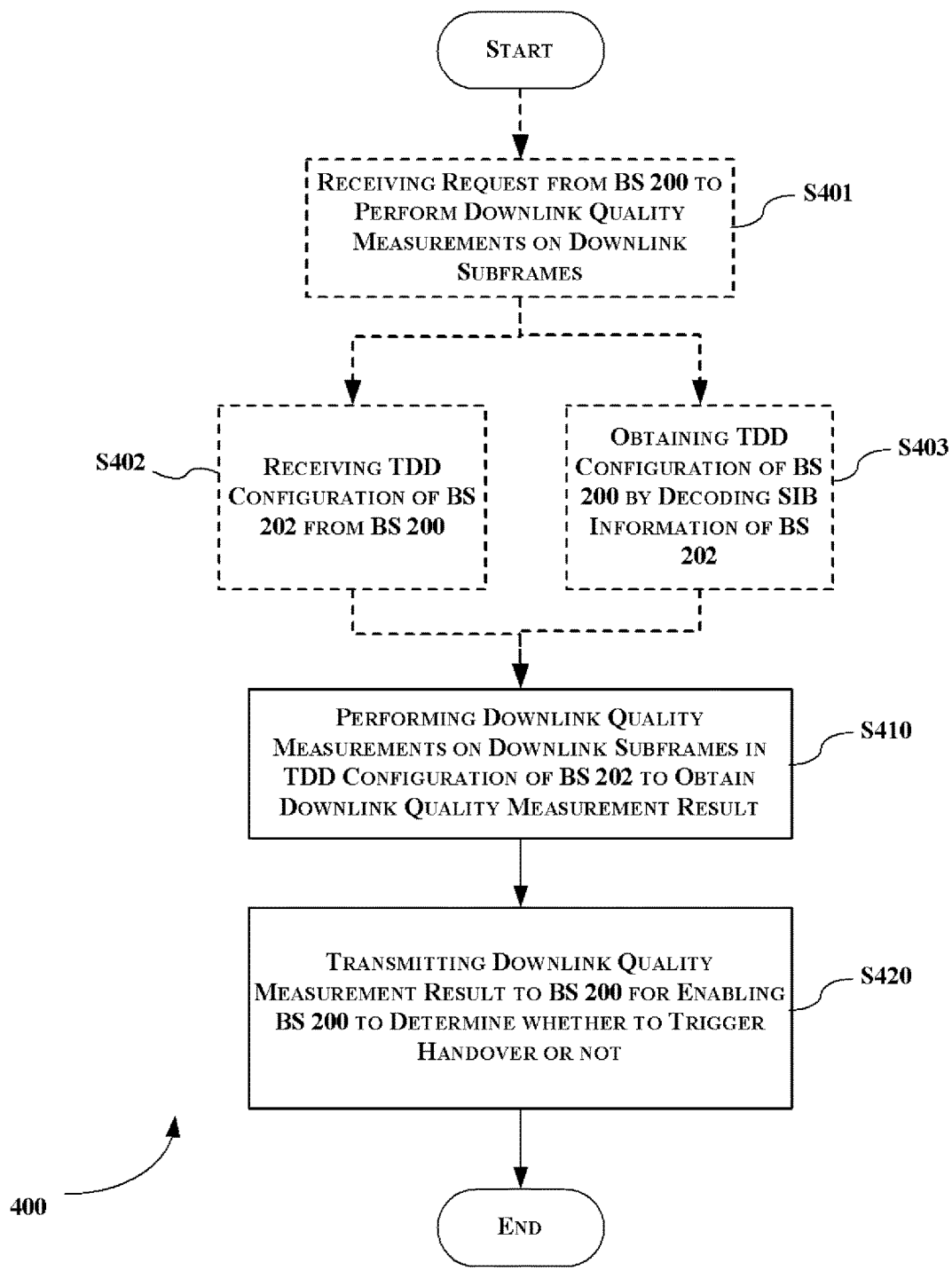
FIG. 4 is a flowchart illustrating a method 400 in UE 110 for use in handover according to a first embodiment of the present disclosure.

FIG. 4 is a flowchart illustrating a method 400 in UE 110 for use in handover from its serving BS, BS 200, to a neighboring BS such as BS 202 or BS 204, etc., according to a first embodiment of the present disclosure. For illustration only, BS 202 is considered in this embodiment.

In step S410, UE 110 performs one or more downlink quality measurements of target or neighboring BS 202 on one or more downlink subframes in a TDD configuration of BS 202 to obtain a downlink quality measurement result.

One downlink quality measurement value corresponds to a downlink quality measurement on one downlink subframe. Thus, the downlink quality measurement result here refers to a result obtained by filtering measurement results for all downlink subframes. For example, filtering may be performed by averaging the measurement results for all downlink subframes and then comparing the averaging result with a predefined threshold value.

The downlink quality measurement result may refer to downlink quality of BS 202. For example, it may be indicated by RSRP and/or RSRQ of BS 202.

In step S420, UE 110 transmits the downlink quality measurement result to BS 200 for enabling serving BS 200 to determine whether to trigger the handover or not.

Moreover, the method 400 may further include one or more of the optional steps S401, S402 and S403 before step S410, but step S402 and step S403 cannot occur simultaneously because these are two alternative steps. Although step S401 is illustrated as occurring before step S402/S403, it is also possible to place step S401 following step S402/S403.

In step S401, UE 110 receives a request from BS 200 to perform the one or more downlink quality measurements on the one or more downlink subframes.

In step S402, UE 110 obtains the TDD configuration of BS 202 by receiving it from BS 200.

For example, BS 200 may acquire the TDD configuration of BS 202 via X2 interface (i.e., X2 interface 300 in FIG. 3) from BS 202. Then, BS 200 may transmit the TDD configuration of BS 202 to the UE 110. As such, UE 110 knows which subframes are normal downlink subframes for BS 202 and then may measure downlink quality of BS 202 on these normal downlink subframes.

In step S403, UE 110 may obtain the TDD configuration of neighboring BS 202 by decoding System Information Block (SIB) information from BS 202. For example, UE 110 may decode the SIB information from BS 202 automatically or according to an order from its serving BS, so as to get the TDD configuration of BS 202.

From third Generation Partnership Project (3GPP) release 9, UE is required by its serving eNB to send Evolved-Universal terrestrial Radio Access Network (E-UTRAN) Cell Global Identifier (ECGI) of a target or neighboring cell to it when the target cell is within a Home eNB. Since ECGI is in SIB, this actually means 3GPP has defined a mechanism for UE to decode SIB information when necessary. So, the corresponding known signaling and procedure may be applied in the present embodiment, and description thereof will be omitted. By decoding SIB from a neighboring cell (i.e., from a BS of the neighboring cell, which thus may be called as a neighboring BS), UE may know the TDD configuration of the neighboring BS. Then, the UE knows at which subframe(s) to measure RSRP/RSRQ of the neighboring BS, so that accuracy of the measurement may be ensured.

In accordance with the first embodiment, the present disclosure enables the UE to perform the downlink quality measurement based on the TDD configuration of the neighboring BS, which results in improvement in reliability of UE's downlink quality measurement by means of a correction at the UE's serving BS while improving accuracy of handover decision.

Figure 5:
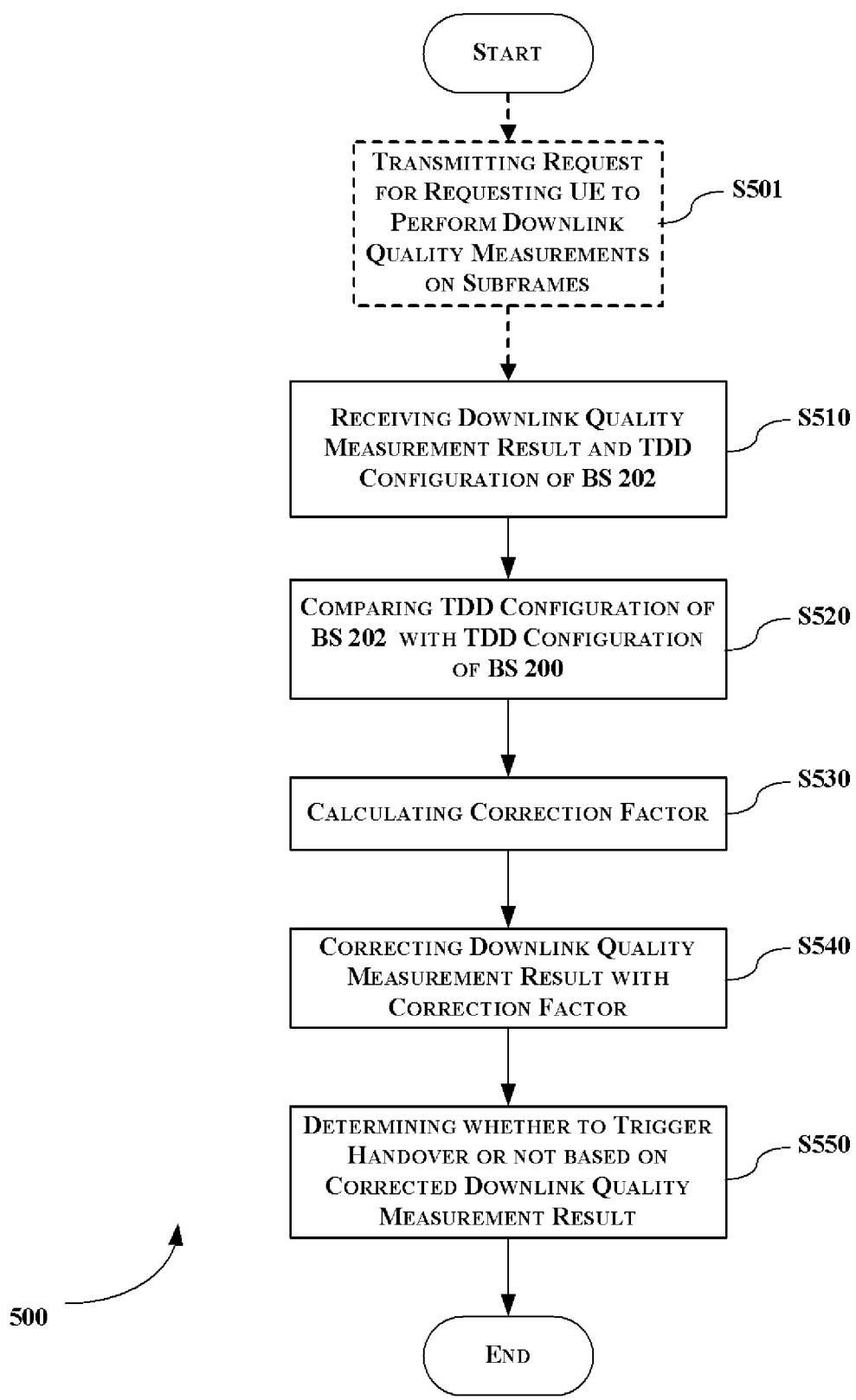
FIG. 5 is a flowchart illustrating a method 500 in BS 200 for handling handover according to a second embodiment of the present disclosure.

FIG. 5 is a flowchart illustrating a method 500 in serving BS 200 for handling handover of UE 110 from BS 200 to a neighboring BS such as BS 202 or BS 204, etc., according to a second embodiment. For illustration only, neighboring BS 202 is considered in this embodiment.

In step S510, the method includes serving BS 200 receiving from UE 110 a downlink quality measurement result of BS 202 and receiving a TDD configuration of BS 202. The downlink quality measurement result here may refer to downlink quality of BS 202 reported by the UE 110. For example, it may be indicated by RSRP and/or RSRQ of BS 202.

The downlink quality measurement result here may be a result obtained by filtering measurement results for all downlink subframes. For example, filtering may be performed by averaging the measurement results for all downlink subframes and then comparing the averaging result with a predefined threshold value.

It should be understood that the step of receiving the TDD configuration of BS 202 may be received before, after or simultaneously with the step of receiving the downlink quality measurement result.

The TDD configuration of BS 202 may be received by BS 200 from BS 202. For example, BS 200 acquires the TDD configuration of BS 202 via X2 interface (i.e., X2 interface 300 in FIG. 3).

Alternatively, BS 200 acquires the TDD configuration by a report from UE 110, if UE 110 is capable of obtaining the TDD configuration of BS 202 by decoding System Information Block (SIB) information from BS 202 automatically or according to an order from BS 200.

According to an embodiment, the method 500 further includes step S501. In step S501, BS 200 transmits a request to UE 110 for requesting UE 110 to perform one or more downlink quality measurements on one or more subframes to obtain the downlink quality measurement result. In this case, UE 110 performs the downlink quality measurements in response to such a request.

For example, the one or more subframes may be one of:
  downlink subframes in the TDD configuration of serving BS 200;
  downlink subframes in the TDD configuration of neighboring BS 202; or
  fixed downlink subframes preconfigured by serving BS 200.

In step S520, the method includes BS 200 comparing the TDD configuration of neighboring BS 202 with a TDD configuration of serving BS 200.

In step S530, the method includes BS 200 calculating a correction factor based on the comparison result.

In step S540, the method includes BS 200 correcting the downlink quality measurement result with the correction factor.

In step S550, the method includes BS 200 determining whether to trigger the handover or not based on the corrected downlink quality measurement result.

For example, if the TDD configuration of BS 200 is DSUDDDDDDD and the TDD configuration of BS 202 is DSUUUDSUUU, BS 200 knows that RSRP reported by UE 110 for BS 202 is 3.5 dB lower than actual (i.e., the correction factor is 3.5 dB), and then it add 3.5 dB to the RSRP reported by UE 110. Based on the corrected RSRP, BS 200 determines whether to trigger the handover procedure or not for UE 110.

If the TDD configuration of BS 200 is exactly the same with that of BS 202, the correction factor may be 0 dB.

With the second embodiment, the present disclosure may correct the UE's possibly inaccurate measurement result by considering at its serving BS dynamic TDD configuration (i.e., the actual TDD configuration of the neighboring BS). As such, the reliability of the downlink quality measurement for a neighboring BS can be improved, and correct handover decision can be guaranteed.

Figure 6:
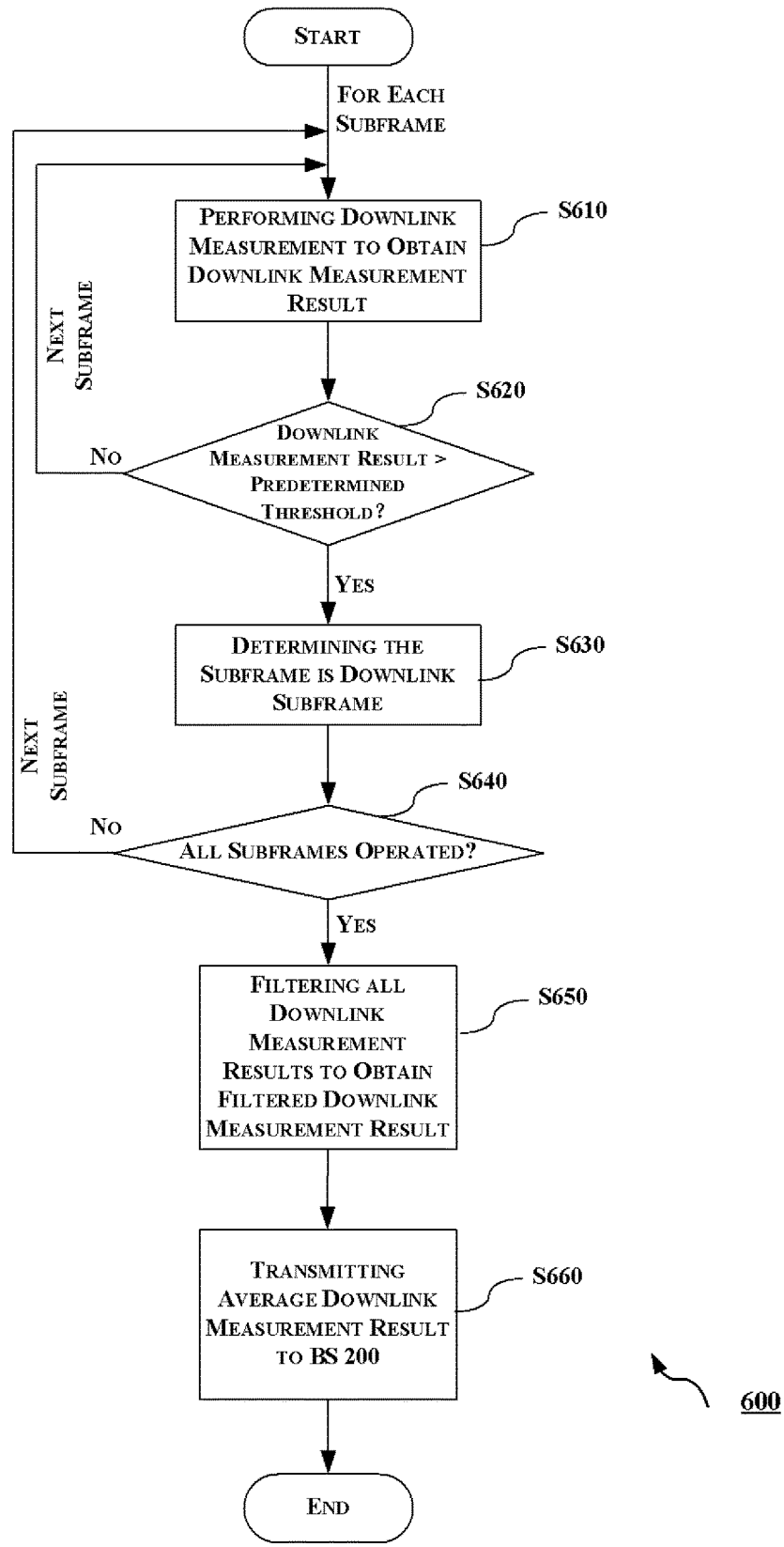
FIG. 6 is a flowchart illustrating a method 600 in UE 110 for use in handover according to a third embodiment of the present disclosure.

FIG. 6 is a flowchart illustrating a method 600 in UE 110 for use in handover from its serving BS, BS 200, to a neighboring BS such as BS 202 or BS 204, etc., according to a third embodiment. For illustration only, BS 202 is considered in this embodiment.

As shown in FIG. 6, for each subframe, the method includes: UE 110 performing a downlink quality measurement of BS 202 on the subframe to obtain a downlink quality measurement result (step S610); and determining if the downlink quality measurement result is higher than a predetermined threshold (step S620). Here, the predetermined threshold is based on empirical values, which, for example, may be determined based on previous measurements.

If the downlink quality measurement result is not higher than the predetermined threshold, the method 600 proceeds to the next subframe in the TDD configuration.

Otherwise, the method includes: UE 110 determining the subframe is a downlink subframe (step S630). Then, the method includes UE 110 checking whether all subframes have been operated or not (step S640). If no, the method 600 proceeds with the next subframe from step S610. Otherwise, the method 600 proceeds to step S650.

Figure 2:
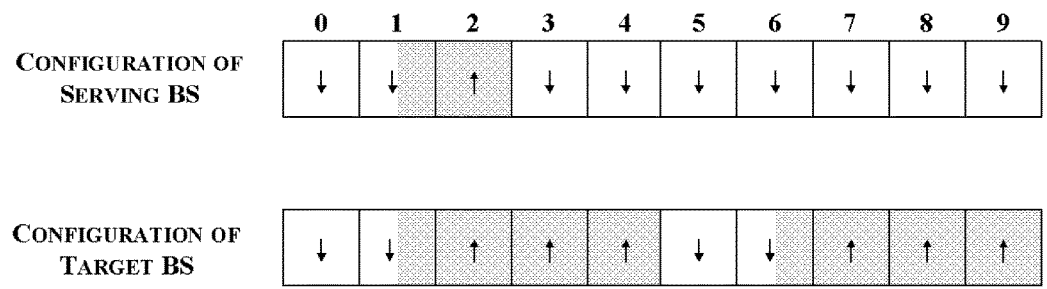
FIG. 2 exemplifies an example of two neighboring BSs with different TDD configurations.

In this embodiment, the expression "all subframes" means all subframes in a TDD configuration. For example, as shown in FIG. 1 or FIG. 2, a LTE TDD configuration has ten subframes. In this case, for example, steps S610, S620, S630 and S640 as illustrated in FIG. 6 will be circulated for each subframe of the ten subframes.

In step S650, the method includes: UE 110 filtering all downlink quality measurement results for all determined downlink subframes to obtain a filtered downlink quality measurement result. For example, such a filtering step may be performed by averaging all downlink quality measurement results and then comparing the averaging result with a predefined threshold value. That is, the filtered downlink quality measurement result is a result that satisfies conditions for handover preparation at UE 110 and will be reported by UE 110 to BS 200.

In step S660, the method includes: UE 110 transmitting the filtered downlink quality measurement result to BS 200 for enabling BS 200 to determine whether to trigger the handover or not.

In accordance with the third embodiment, the UE itself includes a mechanism when performing a downlink quality measurement for a neighboring BS. For example, when the UE performs the downlink quality measurement, the UE checks a measurement value on each subframe. If the measurement value of a subframe is lower than a certain threshold, it can be determined that the subframe is not configured as normal downlink subframe in the neighboring BS and the UE may discard such a measurement. As such, the reliability of downlink quality measurement for handover triggering can be guaranteed, thereby ensuring proper handover decision.

Although the methods 400 and 600 both focus on handling handover under dynamic TDD configuration, the both methods may be also applied to handling cell reselection with dynamic TDD configuration. For explanation of this aspect, UE 110 as show in FIG. 3 is considered again. Normally, UE 110 has BS 200 as its serving BS and has BSs 202 and 204 as neighboring BSs of its serving BS.

[First Example for Cell Reselection]

When UE 110 is in an idle mode, UE 110 may perform one or more downlink quality measurements of a neighboring BS on one or more downlink subframes in a TDD configuration of the neighboring BS instead of a TDD configuration of the serving BS, to obtain a downlink quality measurement result. For example, such a downlink quality measurement result may be obtained by filtering all measurement results on the one or more downlink subframes in accordance with wireless cell-reselection techniques. If the downlink quality measurement result is higher than a threshold value, UE 110 may select the neighboring BS as its target cell in such a manner that the cell reselection is completed. With such a solution, by taking the dynamic TDD configuration of a potential target cell, UE 110 may perform a cell reselection based on accurate downlink quality measurement result, thereby leading to proper cell reselection decision.

[Second Example for Cell Reselection]

When UE 110 is in an idle mode, UE 110 may treat each subframe as a downlink subframe for a neighboring BS and perform measurements on each subframe. Then, if a measurement result of a subframe is not higher than a certain threshold, it can be determined that such a subframe is not configured as a normal downlink subframe in the neighboring BS. In this case, UE 110 may discard the corresponding measurement result. If a measurement result of a subframe is higher than the certain threshold, such a frame may be treated as a normal downlink subframe. Then, all downlink quality measurement results for all determined downlink subframes are filtered in accordance with wireless cell-reselection techniques to obtain a filtered downlink quality measurement result as its target cell in such a manner that the cell reselection is completed. With such a solution, by taking the dynamic TDD configuration of a potential target cell, UE 110 may perform a cell reselection based on accurate downlink quality measurement result, thereby leading to proper cell reselection decision. With such a solution, the reliability of downlink quality measurement for cell reselection can be guaranteed.

Figure 7:
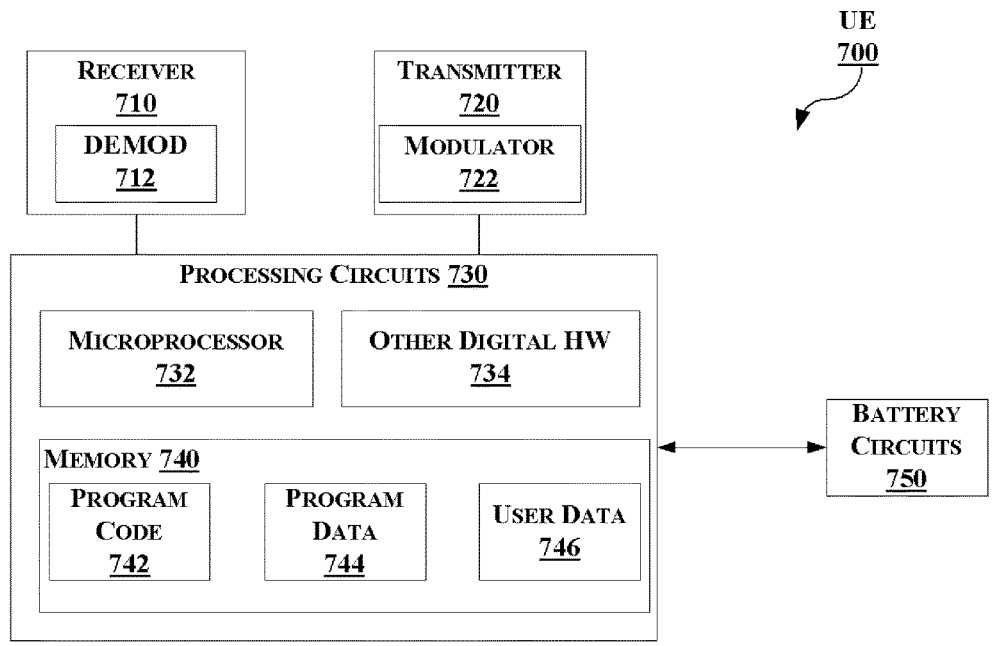
FIG. 7 is a block diagram of a UE 700 configured according to a fourth embodiment of the present disclosure.

FIG. 7 is a block diagram of a UE 700 configured for use in handover from its serving BS to a neighboring BS, according to a fourth embodiment. In particular, UE 700 may be configured to participate in the methods illustrated in FIGS. 4 and/or 6, or variants thereof. As shown, UE 700 includes a receiver circuit 710, which includes at least two antennas and various like radio-frequency components (not shown) and a demodulator 712. Receiver 710 processes radio signals received from one or more BSs and processes the signals, using known radio processing and signal processing techniques, for processing by processor circuits 730. Processing circuits 730 extract data from signals received via receiver 710 and generate information for transmission to the serving BS via transmitter circuit 720. By a non-limiting example, processing circuits 730 may perform one or more downlink quality measurements of the neighboring BS on one or more downlink subframes in a TDD configuration of the neighboring BS to obtain a downlink quality measurement result. Like the receiver 710 and demodulator 712, transmitter 720 and modulator 722 use known radio processing and signal processing components and techniques, typically according to a particular telecommunications standard such as LTE and LTE-A (Advanced), and are configured to format digital data and generate and condition a radio signal for transmission over the air, for example transmit the downlink quality measurement result to the serving BS.

Processing circuits 730 include one or several microprocessors 732, digital signal processors, and the like, as well as other digital hardware 734 and memory circuit 740. Memory 740, which includes one or several types of memory such as read-only memory (ROM), random-access memory (RAM), cache memory, flash memory devices, optical storage devices, etc., stores program code 742 for executing one or more telecommunications and/or data communications protocols and for carrying out one or more of the techniques described herein. Memory 740 further stores program data 744, user data 746 received from the BS and to be transmitted to the BS, and also stores various parameters, pre-determined threshold values, and/or other program data for controlling the operation of UE 700. UE 700 includes various other features that are not shown, in addition to the battery circuits 750 pictured in FIG. 7; these features, such as user interface circuitry, positioning circuits, and the like, are well known to those skilled in the art and are therefore not illustrated.

In various embodiments, processing circuits 730, using appropriate program code 742 stored in memory 740, are configured to implement one or more of the handover-related techniques described herein. Of course, not all of the steps of these techniques are necessarily performed in a single microprocessor or even in a single module. For instance, while an LTE UE may include measurement functionality that performs one or more downlink quality measurements of the neighboring BS on one or more downlink subframes in a TDD configuration of the neighboring BS to obtain a downlink quality measurement result, other systems may place measurement or similar functionality in a physically separate unit.

Figure 8:
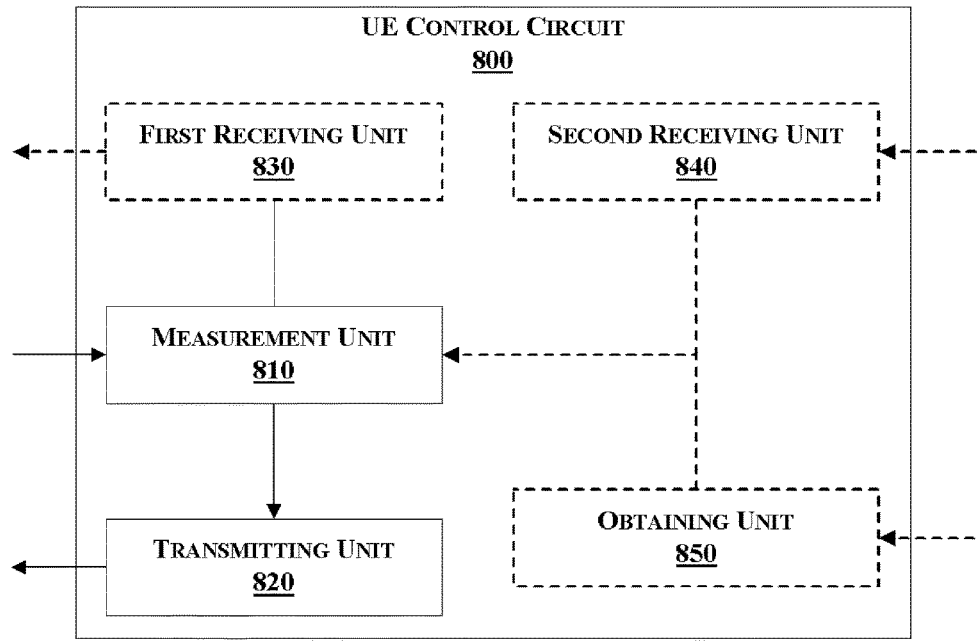
FIG. 8 illustrates a UE control circuit 800 according to a fifth embodiment of the present disclosure.

Thus, FIG. 8 presents a more generalized view of a UE control circuit 800 configured to carry out one or several of the handover handling techniques described herein according to a fifth embodiment. UE control circuit 800 here may be also considered as a UE of the present disclosure. This UE control circuit 800 may have a physical configuration that corresponds directly to processing circuits 730, for example, or may be embodied in two or more modules or units, like the configuration illustrated in FIG. 8, and may be implemented as hardware, software or a combination of hardware and software. In any case, however, UE control circuit 800 is configured to implement at least two functions, which are pictured in FIG. 8 as measurement unit 810 and retransmitting unit 820.

Measurement unit 810 performs one or more downlink quality measurements of the neighboring BS on one or more downlink subframes in a TDD configuration of the neighboring BS to obtain a downlink quality measurement result. Normally, one downlink quality measurement value corresponds to a downlink quality measurement on one downlink subframe. Thus, the downlink quality measurement result here refers to a result obtained by filtering measurement results for all downlink subframes in accordance with wireless handover techniques. For example, filtering may be performed by averaging the measurement results for all downlink subframes and then comparing the averaging result with a predefined threshold value.

The downlink quality measurement result may refer to downlink quality of the neighboring BS. For example, it may be indicated by RSRP and/or RSRQ of the neighboring BS.

Transmitting unit 820 transmits said downlink quality measurement result to the serving BS for enabling the serving BS to determine whether to trigger the handover or not.

UE control circuit 800 may further include three optional units, i.e., a first receiving unit 830, a second receiving unit 840 and an obtaining unit 850.

The first receiving unit 830 receives a request from the serving BS to perform the one or more downlink quality measurements on the one or more downlink subframes.

The second receiving unit 840 receives the TDD configuration of the neighboring BS from the serving BS.

The obtaining unit 850 obtains the TDD configuration of the neighboring BS by decoding System Information Block (SIB) information of the neighboring BS.

The UE 700 as shown in FIG. 7 as well as UE control circuit 800 as shown in FIG. 8 may perform the downlink quality measurement based on the TDD configuration of the neighboring BS, which results in improvement in reliability of UE's downlink quality measurement by means of a correction at the UE's serving BS while improving accuracy of handover decision.

Figure 9:
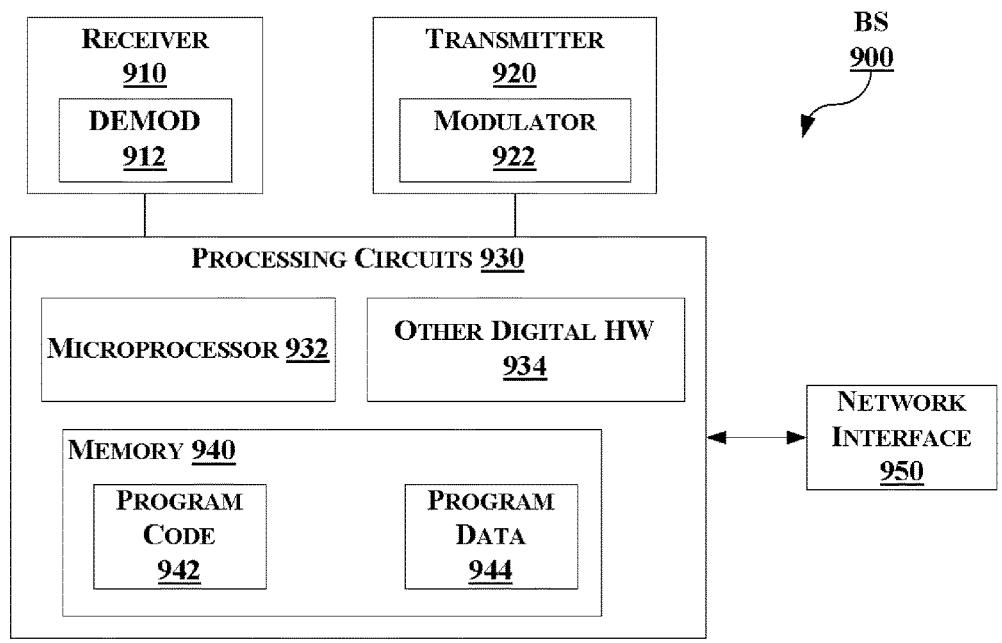
FIG. 9 is a block diagram of a BS 900 configured according to a sixth embodiment of the present disclosure.

FIG. 9 is a block diagram of a BS 900 for handling handover of a UE served by the BS 900 from the BS 900 to a neighboring BS according to a sixth embodiment. In particular, the BS 900 may be configured to implement the method as illustrated in FIG. 5, or variants thereof. The BS 900 includes a receiver circuit 910, which includes at least two antennas and various other radio-frequency components (not shown) and a demodulator circuit 912. Receiver 910 processes radio signals received from one or more wireless BS and processes the signals, using known radio processing and signal processing techniques, to convert the received radio signals into digital samples for processing by processor circuits 930. More particularly, receiver 910 is capable of receiving one or more data blocks simultaneously from the UE by means of its antennas. Processing circuits 930 extract data from signals received via receiver 910 and generate information for transmission to the UE via transmitter circuit 920. For example, processing circuits 930 may compare the TDD configuration of the neighboring BS with a TDD configuration of the serving BS; calculate a correction factor based on the comparison result; correct the downlink quality measurement result with the correction factor; and determine whether to trigger the handover or not based on the corrected one or more downlink quality measurement result. Like the receiver 910 and demodulator 912, transmitter 920 and modulator 922 use known radio processing and signal processing components and techniques, typically according to one or more telecommunications standards, and are configured to format digital data and generate and condition a radio signal, from that data, for transmission over the air, for example transmit a request to the UE for requesting the UE to perform one or more downlink quality measurements on one or more subframes to obtain the downlink quality measurement result.

Processing circuits 930 include one or several microprocessors 932, digital signal processors, and the like, as well as other digital hardware 934 and memory circuit 940. Memory 940, which may include one or several types of memory such as read-only memory (ROM), random-access memory (RAM), cache memory, flash memory devices, optical storage devices, etc., stores program code 942 for executing one or more telecommunications and/or data communications protocols and for carrying out one or more of the techniques for signaling handover-related information described herein. Memory 940 further stores program data 944 as well as buffered traffic data received from UEs and from network interface 950, and also stores various parameters, predetermined threshold values, and/or other program data for controlling the general operation of the BS 900.

In some embodiments, processing circuits 930, using appropriate program code 942 stored in memory 940, are configured to implement one or more of the techniques described herein. Of course, not all of the steps of these techniques are necessarily performed in a single microprocessor or even in a single module. For instance, while an LTE eNB may include comparing functionality that compares the TDD configuration of the neighboring BS with a TDD configuration of the serving BS, other systems may place comparing or similar functionality in a physically separate unit.

Figure 10:
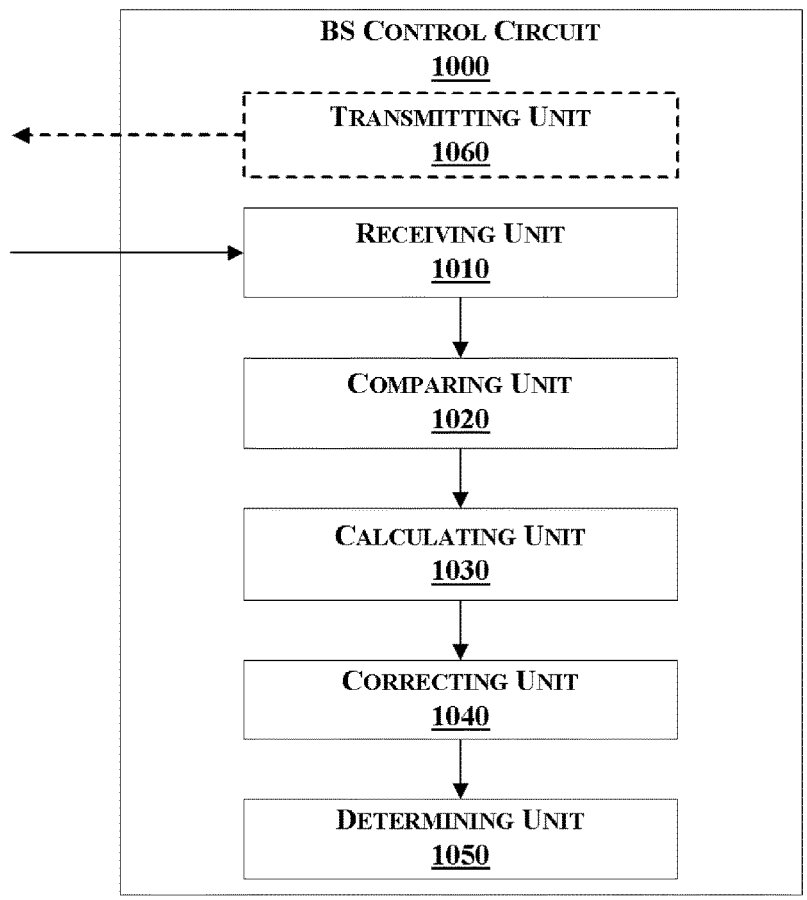
FIG. 10 illustrates a BS control circuit 1000 according to a seventh embodiment of the present disclosure.

Thus, FIG. 10 presents a more generalized view of a BS control circuit 1000 configured to carry out one or several of the handover handling techniques discussed herein according to a seventh embodiment. BS control circuit 1000 here may be also considered as a BS of the present disclosure. This BS control circuit 1000 may have a physical configuration that corresponds directly to processing circuits 930, for example, or may be embodied in two or more modules or units, like the configuration illustrated in FIG. 10, and may be implemented as hardware, software or a combination of hardware and software. In any case, however, BS control circuit 1000 is configured to implement at least five functions, which are pictured in FIG. 10 as receiving unit 1010, comparing unit 1020, calculating unit 1030, correcting unit 1040, and determining unit 1050.

Receiving unit 1010 receives receive from the UE a downlink quality measurement result of the neighboring BS. The downlink quality measurement result here may refer to downlink quality of the neighboring BS reported by the UE. For example, it may be indicated by RSRP and/or RSRQ of the neighboring BS.

The downlink quality measurement result here may be a result obtained by filtering measurement results for all downlink subframes. For example, filtering may be performed by averaging the measurement results for all downlink subframes and then comparing the averaging result with a predefined threshold value.

Receiving unit 1010 further receives a TDD configuration of the neighboring BS. It should be understood that the step of receiving the TDD configuration of the neighboring BS may be received before, after or simultaneously with the step of receiving the downlink quality measurement result.

Receiving unit 1010 may further receive the TDD configuration of the neighboring BS from the neighboring BS. For example, receiving unit 1010 may acquire the TDD configuration of the neighboring BS via X2 interface (i.e., X2 interface 300 in FIG. 3) from the neighboring BS.

Alternatively, receiving unit 1010 may also acquires the TDD configuration by a report from the UE, if the UE is capable of obtaining the TDD configuration of the neighboring BS by decoding System Information Block (SIB) information from the neighboring BS automatically or according to an order from BS control circuit 1000.

Comparing unit 1020 compares the TDD configuration of the neighboring BS with a TDD configuration of the serving BS.

Calculating unit 1030 calculates a correction factor based on the comparison result.

Correcting unit 1040 corrects the downlink quality measurement result with the correction factor.

Determining unit 1050 determines whether to trigger the handover or not based on the corrected one or more downlink quality measurement result.

BS control circuit 1000 may optionally include a transmitting unit 1060 for transmitting a request to the UE for requesting the UE to perform one or more downlink quality measurements on one or more subframes to obtain the downlink quality measurement result. In response to such requesting, the UE performs one or more downlink quality measurements so as to obtain the downlink quality measurement result.

The one or more subframes may be one of:
- downlink subframes in the TDD configuration of the serving BS;
- downlink subframes in the TDD configuration of the neighboring BS; or
- fixed downlink subframes preconfigured by the serving BS.

The BS 900 as shown in FIG. 9 as well as BS control circuit 1000 as shown in FIG. 10 may correct the UE's possibly inaccurate measurement result by considering at its serving BS dynamic TDD configuration (i.e., the actual TDD configuration of the neighboring BS). As such, the reliability of the downlink quality measurement for a neighboring BS can be improved, and correct handover decision can be guaranteed.

It should be noted that two or more different units in this disclosure may be logically or physically combined. For example, the first receiving unit 830 and the second receiving unit 840 may be combined as one single unit.

It will be readily understood that although the forgoing first, third, fourth and fifth embodiments are illustrated in the context of handover handling, those solutions may be also applicable in cell reselection.

Other arrangements of the present disclosure include software programs performing the steps and operations of the method embodiments, which are firstly generally described and then explained in detail. More specifically, a computer program product is such an embodiment, which includes a computer-readable medium with a computer program logic encoded thereon. The computer program logic provides corresponding operations to provide the above described handover/cell reselection handling scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g., CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g., a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

The foregoing description gives only the embodiments of the present disclosure and is not intended to limit the present disclosure in any way. Thus, any modification, substitution, improvement or like made within the principle of the present embodiments should be encompassed by the scope of the present disclosure.

What is claimed is:

1. A method in a User Equipment, UE, for use in handover from a serving base station associated with the UE to a neighboring base station, the method comprising:
   obtaining a dynamic Time Division Duplex (TDD) configuration of the neighboring base station;
   performing one or more downlink quality measurements of the neighboring base station on one or more downlink subframes in the dynamic TDD configuration of the neighboring base station to obtain a downlink quality measurement result; and
   transmitting said downlink quality measurement result to the serving base station for enabling the serving base station to determine whether to trigger the handover or not by calculating a correction factor based on a comparison result of the dynamic TDD configuration of the neighboring base station with a TDD configuration of the serving base station, and correcting the downlink quality measurement result with the correction factor.

2. The method according to claim 1, further comprising: receiving a request from the serving base station to perform the one or more downlink quality measurements on the one or more downlink subframes.

3. The method according to claim 1, wherein said downlink quality measurement result includes a Reference Signal Receiving Power, RSRP, measurement result and/or a Reference Signal Receiving Quality, RSRQ, measurement result of the neighboring base station.

4. The method according to claim 1, further comprising: receiving the dynamic TDD configuration of the neighboring base station from the serving base station.

5. The method according to claim 1, wherein the dynamic TDD configuration of the neighboring base station is obtained by decoding System Information Block, SIB, information of the neighboring base station.

6. A method in a serving base station for handling handover of a User Equipment, UE, from the serving base station to a neighboring base station, comprising:
   receiving from the UE a downlink quality measurement result of the neighboring base station and receiving a Time Division Duplex, TDD, configuration of the neighboring base station;
   comparing the TDD configuration of the neighboring base station with a TDD configuration of the serving base station;
   calculating a correction factor based on the comparison result;
   correcting the downlink quality measurement result with the correction factor; and
   determining whether to trigger the handover or not based on the corrected one or more downlink quality measurement result.

7. The method according to claim 6, comprising transmitting a request to the UE for requesting the UE to perform one or more downlink quality measurements on one or more subframes to obtain the downlink quality measurement result.

8. The method according to claim 7, wherein the one or more subframes are downlink subframes in the TDD configuration of the serving base station.

9. The method according to claim 7, wherein the one or more subframes are downlink subframes in the TDD configuration of the neighboring base station.

10. The method according to claim 7, wherein the one or more subframes are fixed downlink subframes preconfigured by the serving base station.

11. The method according to claim 6, wherein said downlink quality measurement result includes a Reference Signal Receiving Power, RSRP, measurement result and/or a Reference Signal Receiving Quality, RSRQ, measurement result of the neighboring base station.

12. The method according to claim 6, wherein the TDD configuration of the neighboring base station is received from the neighboring base station.

13. A base station for handling handover of a User Equipment, UE, served by the base station from the base station to a neighboring base station, comprising a processing circuit configured to perform the method according to claim 6.

14. A User Equipment, UE, for use in handover from a serving base station associated with the UE to a neighboring base station, the UE comprising:
    at least one processor configured to:
    receive a dynamic Time Division Duplex (TDD) configuration of the neighboring base station;
    perform one or more downlink quality measurements of the neighboring base station on one or more downlink subframes in the dynamic TDD configuration of the neighboring base station to obtain a downlink quality measurement result; and
    transmit said downlink quality measurement result to the serving base station for enabling the serving base station to determine whether to trigger the handover or not calculating a correction factor based on a comparison result of the dynamic TDD configuration of the neighboring base station with a TDD configuration of the serving base station, and correcting the downlink quality measurement result with the correction factor.

15. The UE according to claim 14, wherein the at least one processor is further configured to receive a request from the serving base station to perform the one or more downlink quality measurements on the one or more downlink subframes.

16. The UE according to claim 14, wherein said downlink quality measurement result includes a Reference Signal Receiving Power, RSRP, measurement result and/or a Reference Signal Receiving Quality, RSRQ, measurement result of the neighboring base station.

17. The UE according to claim 14, wherein the at least one processor is further configured to receive the dynamic TDD configuration of the neighboring base station from the serving base station.

18. A base station for handling handover of a User Equipment, UE, served by the base station from the base station to a neighboring base station, the base station comprising:
    at least one processor configured to:
    receive from the UE a downlink quality measurement result of the neighboring base station and receiving a Time Division Duplex, TDD, configuration of the neighboring base station;
    compare the TDD configuration of the neighboring base station with a TDD configuration of the serving base station;
    calculate a correction factor based on the comparison result;
    correct the downlink quality measurement result with the correction factor; and
    determine whether to trigger the handover or not based on the corrected one or more downlink quality measurement result.

* * * * *